United States Patent [19]

Mitchell

[11] E Patent Number: Re. 31,917

[45] Reissued Date of Patent: Jun. 18, 1985

[54] VALVE TIMING MECHANISMS

[76] Inventor: Stephen W. Mitchell, 93 Lowercroft Rd., Starling, Bury, Lancashire, England

[21] Appl. No.: 450,343

[22] Filed: Dec. 16, 1982

Related U.S. Patent Documents

Reissue of:

[64] Patent No.: 4,131,096
Issued: Dec. 26, 1978
Appl. No.: 779,877
Filed: Mar. 21, 1977

[30] Foreign Application Priority Data

Apr. 2, 1976 [GB] United Kingdom ..... 13370/76

[51] Int. Cl.[3] ..... F01L 1/34

[52] U.S. Cl. ..... 123/90.15; 123/90.31; 464/2

[58] Field of Search ..... 123/90.15, 90.17, 90.31; 74/568 R; 464/2, 1

[56] References Cited

U.S. PATENT DOCUMENTS

| | | | |
|---|---|---|---|
| 2,279,413 | 4/1942 | Read | 123/90.15 |
| 2,977,943 | 4/1961 | Lieberherr | 123/90.15 |
| 3,502,059 | 3/1970 | Davis | 123/90.15 |
| 3,516,394 | 6/1970 | Nichols | 123/90.17 |
| 3,633,555 | 1/1972 | Raggi | 64/25 X |

FOREIGN PATENT DOCUMENTS

| | | | |
|---|---|---|---|
| 2305589 | 10/1976 | France | 123/90.17 |
| 0645285 | 9/1961 | Italy | 123/90.15 |
| 0029560 | of 1914 | United Kingdom | 123/90.31 |
| 0649192 | 1/1951 | United Kingdom | 123/90.17 |
| 0808689 | 2/1959 | United Kingdom | 123/90.31 |

*Primary Examiner*—Craig R. Feinberg
*Assistant Examiner*—W. R. Wolfe
*Attorney, Agent, or Firm*—Cushman, Darby & Cushman

[57] ABSTRACT

A variable valve timing mechanism for an internal combustion engine including at least one valve-actuating camshaft driven from a crankshaft is described. The valve timing mechanism comprises a movable member which is arranged in use to be rotatable by the crankshaft and movable in translation relative to the camshaft in dependence upon an engine operating condition such as engine load or speed. The movable member is connected to the crankshaft by an eccentric linkage such that movement of the movable member relative to the camshaft varies the angular position of the camshaft relative to the crank and also varies the rate of angular movement of the camshaft, thereby varying the valve timing.

18 Claims, 10 Drawing Figures

VALVE TIMING MECHANISMS

Matter enclosed in heavy brackets [ ] appears in the original patent but forms no part of this reissue specification; matter printed in italics indicates the additions made by reissue.

The present invention relates to valve timing mechanisms, and in particular to variable valve timing mechanisms for internal combustion engines.

It is known that the volumetric efficiency of for example a four stroke poppet valve internal combustion engine is a function of the valve timing. An engine with a valve timing such that the inlet valve opens slightly before the piston is at the top dead centre (TDC) position and closes slightly after the piston is at the bottom dead centre (BDC) position will result in good volumetric efficiency and hence good torque characteristics at low engine speeds. In contrast, if good volumetric efficiency and hence high power is to be obtained at high engine speeds it is necessary for the inlet valve to open substantially before the piston is at the TDC position and close substantially after the piston is at the BDC position.

A further problem met when considering valve timing mechanisms is that of inlet and exhaust valve overlap, that is the condition in which both the inlet and exhaust valves are open when the piston is approaching and departing from the TDC position. The reduction of this overlap at low engine speeds results in reduced exhaust emissions by preventing a proportion of the incoming air/fuel charge from going into the exhaust system. It is also known that benefit can be obtained by retarding the opening of the exhaust valve at low engine speeds so as to obtain more work out of the expansion stroke and thereby reduce fuel consumption, and by advancing the opening of the exhaust valve at the high engine speeds, so as to avoid work in scavenging the exhaust gases.

In view of the above, engines with fixed valve timing must be a compromise.

It is an object of the present invention to provide a valve timing mechanism which avoids the problems associated with known valve timing mechanisms.

According to the present invention, there is provided a valve timing mechanism for an internal combustion engine including at least one valve-actuating camshaft driven from a crankshaft, the mechanism comprising a movable member which is arranged in use to be rotatable by the crankshaft and movable in translation relative to the camshaft in dependence upon an engine operating condition, the movable member being connected to the camshaft by an eccentric linkage such that movement of the movable member relative to the camshaft varies the angular position of the camshaft relative to the crank and also varies the rate of angular movement of the camshaft, thereby varying the valve timing.

The present invention also provides an internal combustion engine comprising at least one cylinder, at least one inlet and at least one exhaust valve for the or each cylinder, camshafts for opening the inlet and outlet valves of the or each cylinder, a crankshaft, and means for driving the camshafts from the crankshaft, the driving means comprising a movable member which is rotatable by the crankshaft and connected to at least one camshaft by an eccentric linkage, and the movable member being movable in translation relative to said at least one camshaft in dependence upon an operating condition of the engine, movement of the movable member causing the eccentric linkage to vary the angular position of the camshaft relative to the angular position of the crankshaft and also to vary the rate of angular movement of the camshaft, thereby varying the valve timing.

Preferably the movement in translation of the member is in dependence upon engine load and/or speed. The movable member may be supported on a pivotal arm or alternatively may be mounted on a slide for example.

The pivotal arm or slide can be arranged so that the opening and closing of the inlet and exhaust valves can be varied together in response to engine speed variations and also the opening and closing of the inlet valves relative to the opening and closing of the exhaust valves can be varied in response to engine load variations.

The movable member is advantageously in the form of a plate provided with a radial slot which slidably receives a follower supported eccentrically by the camshaft. Alternatively, the movable member may support an eccentrically mounted follower which is slidably received in a slot in a plate supported by the camshaft.

An embodiment of the present invention will now be described by way of example with reference to the accompanying drawings, in which.

Figure 1:
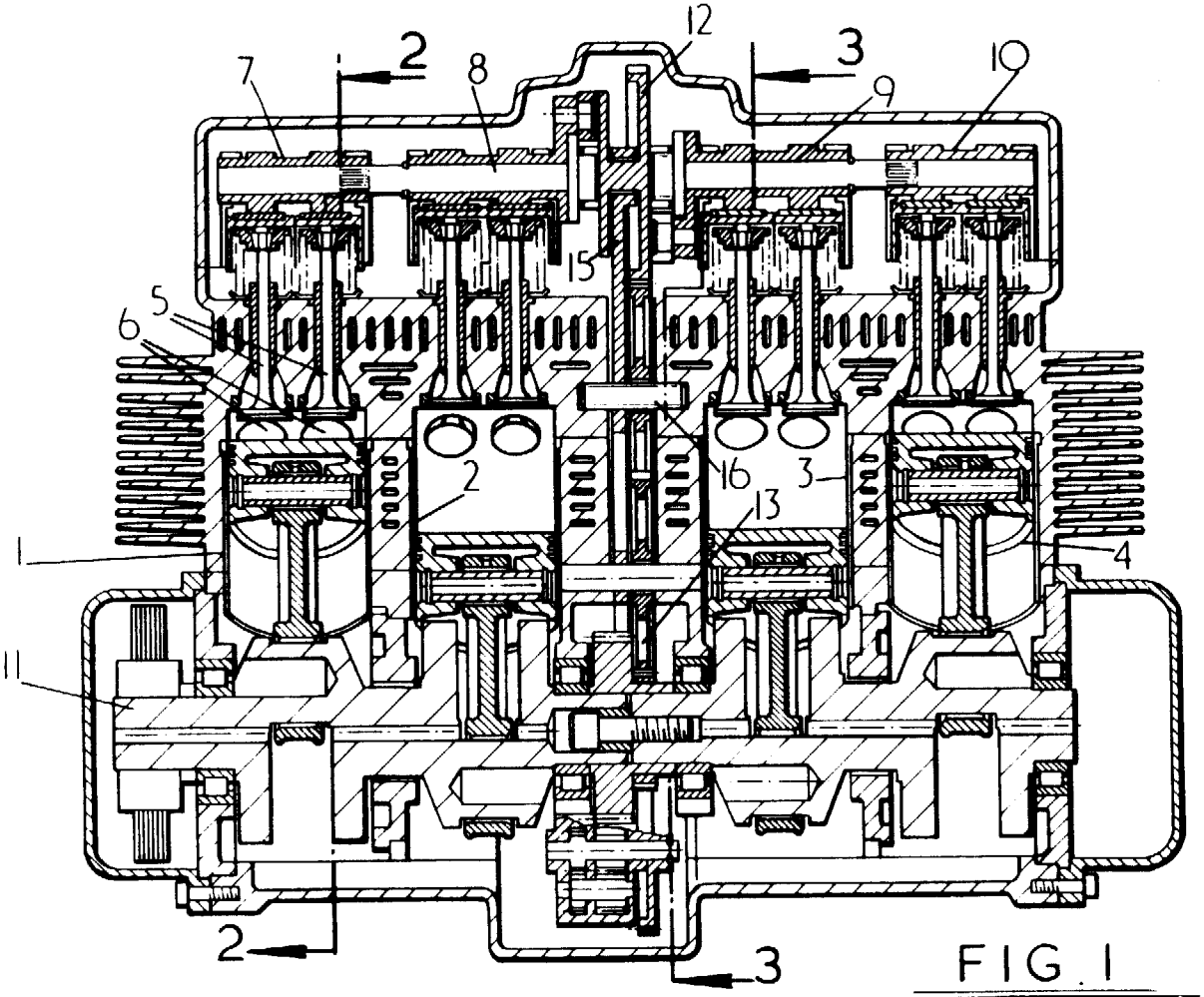
FIG. 1 is a sectional view through the cylinder of an engine embodying the present invention.

Referring to FIG. 1, the illustrated engine has many conventional features which it is considered do not need detailed description. The engine has four cylinders 1,2,3 and 4 each having two inlet valves 5 and two exhaust valves 6. Four inlet valve camshafts 7,8,9 and 10 are shown, four exhaust valve camshafts also being provided but not shown in FIG. 1. Camshafts 7 and 10 are driven by shaft extending through camshafts 8 and 9. A crankshaft 11 drives a rotatable member 12 via gears 13 and 14, the member 12 being supported on an arm 15 pivotal about a journal 16 on which the gear 14 is supported.

Figure 2:
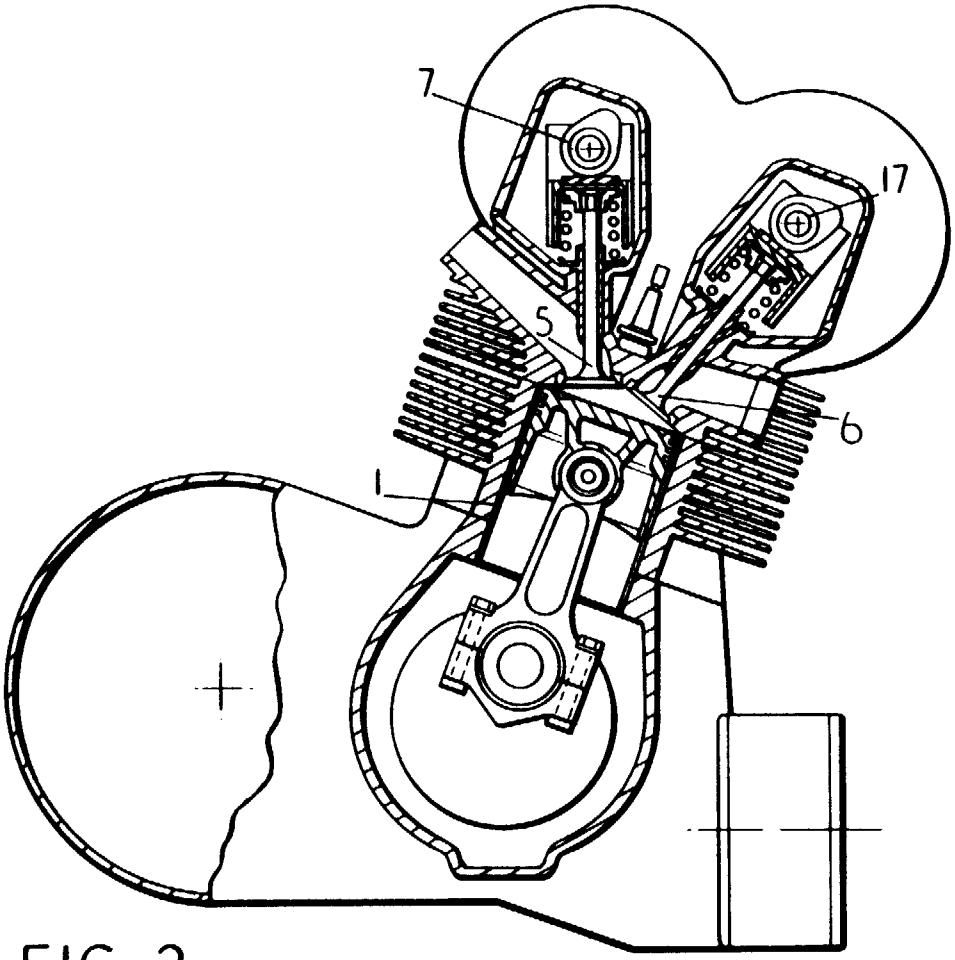
FIG. 2 is a sectional view on the line 2—2 of FIG. 1.
Figure 3:
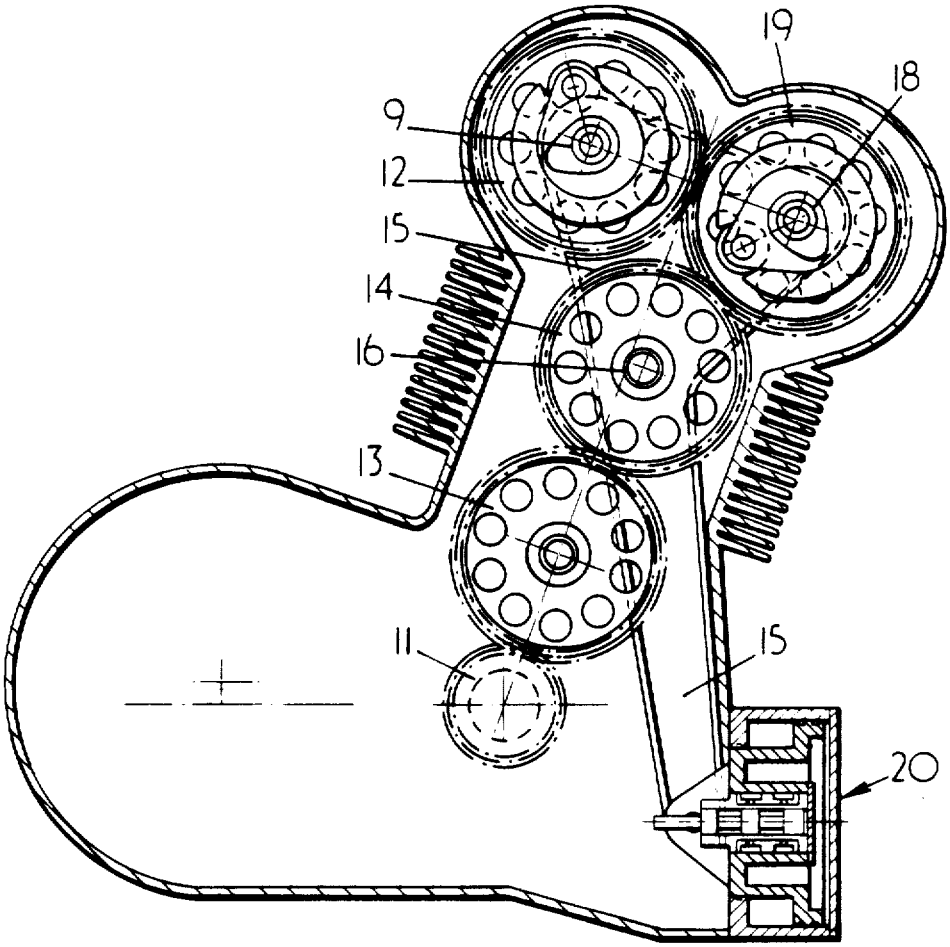
FIG. 3 is a sectional view on the line 3—3 of FIG. 1.

Referring now to FIGS. 2 and 3, an exhaust cam 17 for the exhaust valves of cylinder 1 is shown in FIG. 2, and an exhaust cam 18 for the exhaust valves of cylinder 3 is shown in FIG. 3. It may be seen from FIG. 3 that the member 12 is driven by the cog 14 via a further member 19, the members 12 and 19 being movable together on the arm 15 pivoted about the journal 16. The position of the arm 15 is determined in more detail with reference to FIG. 9.

Figure 4:
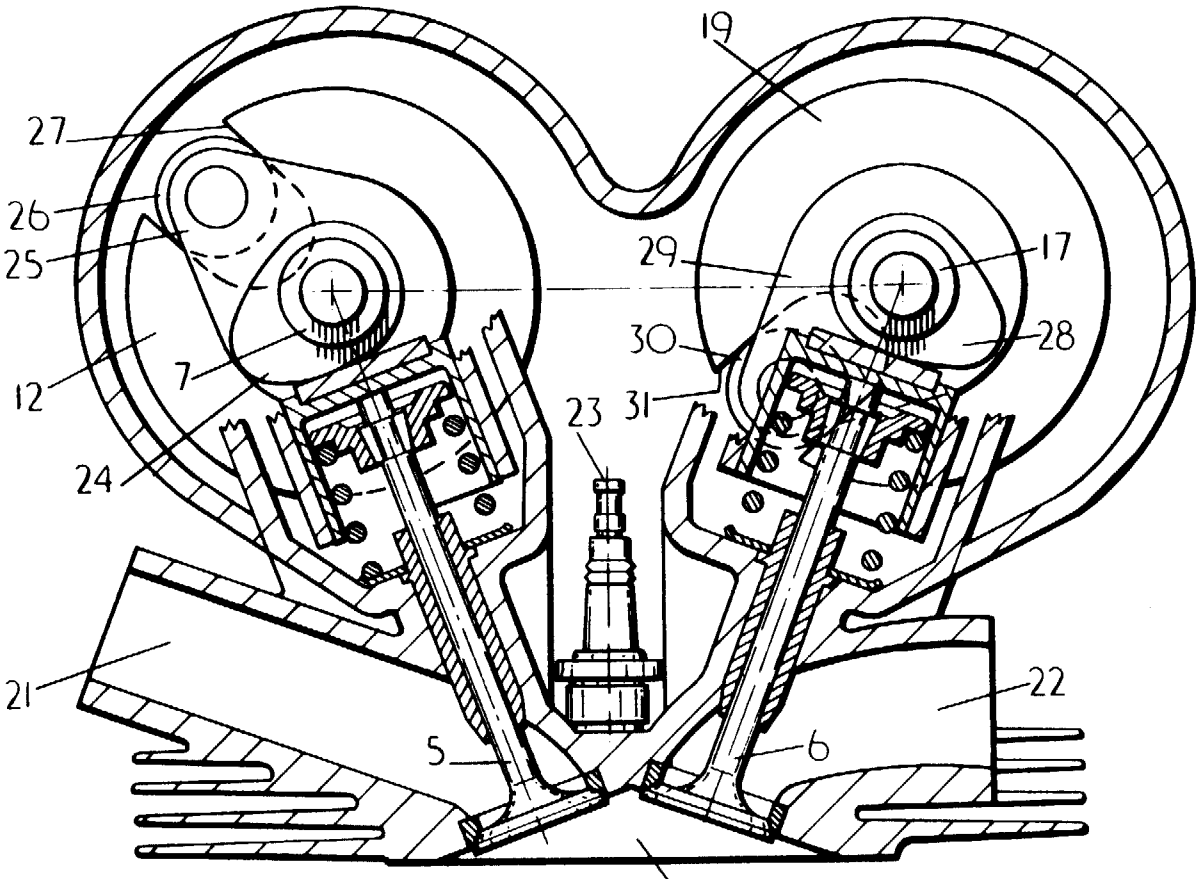
FIG. 4 is a sectional view of a portion of FIG. 2 to an enlarged scale and showing more detail.

Referring now to FIG. 4, the inlet and exhaust valves 5, 6, inlet and exhaust ports 21, 22, and a spark plug 23 are shown. In addition, the timing mechanism driving the inlet and exhaust camshafts 7,17 are shown in more detail.

The inlet valve camshaft 7 supports a cam 24 and an eccentric 25 supporting a follower 26. The follower 26 is located in a slot 27 provided in the movable member 12 (hereinafter referred to as the eccentric plate). The exhaust camshaft 17 which operates the exhaust valves of the cylinder 1 is also provided with a cam 28, an eccentric 29, a follower 30 and a slot 31 in the movable member or eccentric plate 19. The eccentric plates 12 and 19 are mounted in bearings and are driven at half engine speed by the gears 13, 14 from the engine crankshaft 11. The bearings are housed in the arm 15 which can pivot such that the axes of rotation of the eccentric plates 12 and 19 can coincide with the axes of the camshafts 7 and 17 or can be moved eccentric to these camshafts.

FIG. 4 shows the high engine speed condition where the position of the arm 15 is against a suitable stop and is such that the axis of the inlet eccentric plate 12 coincides with the axis of the inlet camshaft 7. The timing of the inlet valve opening and closing is as determined by the design of the inlet cam 24. The axis of the exhaust valve eccentric plate 19 also coincides with the axis of the exhaust camshaft 17 and the timing of the exhaust valve opening and closing is as determined by the design of the exhaust cam 28. The cams are designed so that the inlet valve 5 will open substantially before the piston is at the top dead centre position and close substantially after the piston is at the bottom dead centre position. The exhaust valve 6 will be opened substantially before the piston is at the BDC position and close substantially after the piston is at the TDC position.

Figure 5:
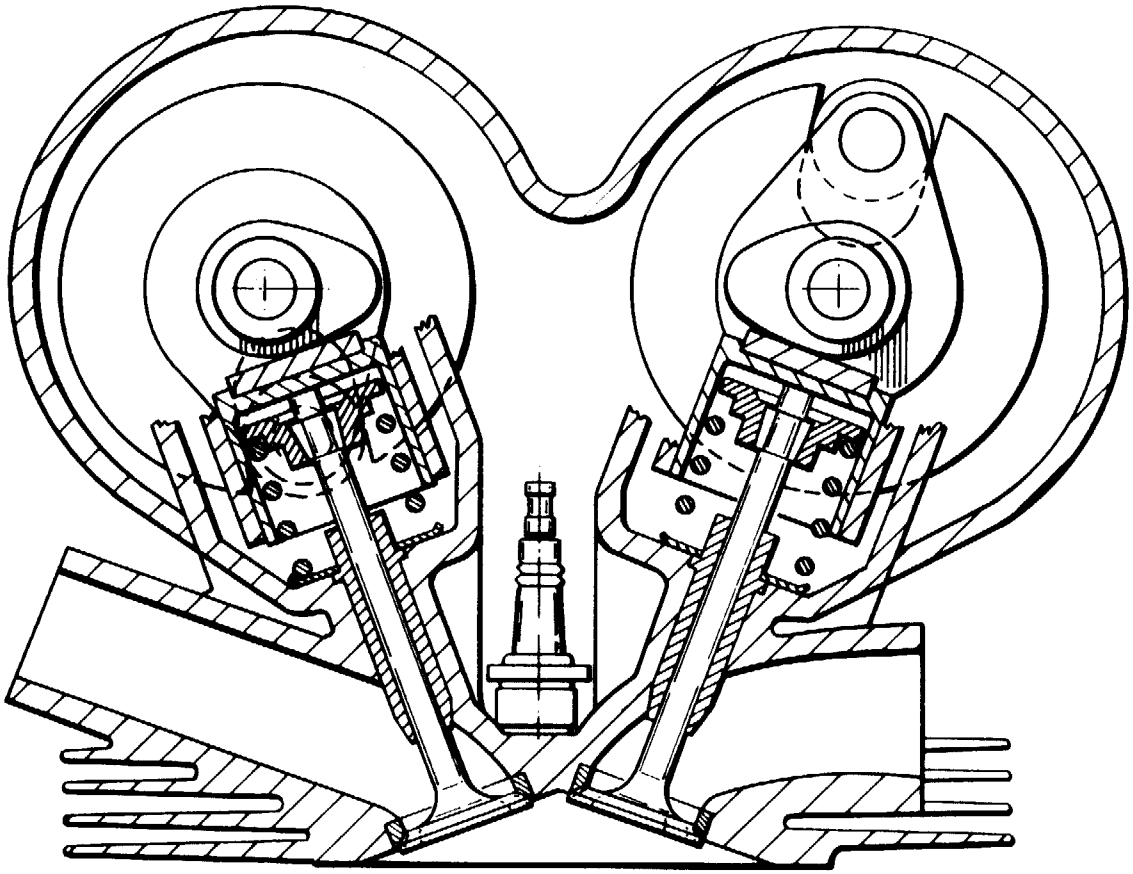
FIGS. 5, 6 and 7 show the same view as FIG. 4 with components of the engine being relatively displaced.

FIG. 4 shows the inlet valve 5 about to open and the exhaust valve about to open, and FIG. 5 shows the inlet valve 5 about to close and the exhaust valve 6 about to close. It can be seen that this is in the high engine speed condition where the axes of the camshaft 7 and 17 coincide with the eccentric plates 12 and 19. FIGS. 4 and 5 do not shown the correct relative positions of the inlet and exhaust camshafts but simply the opening and closing positions. The reference numerals of FIG. 4 are not shown but are referred to in the description of FIGS. 5 to 7.

Figure 6:
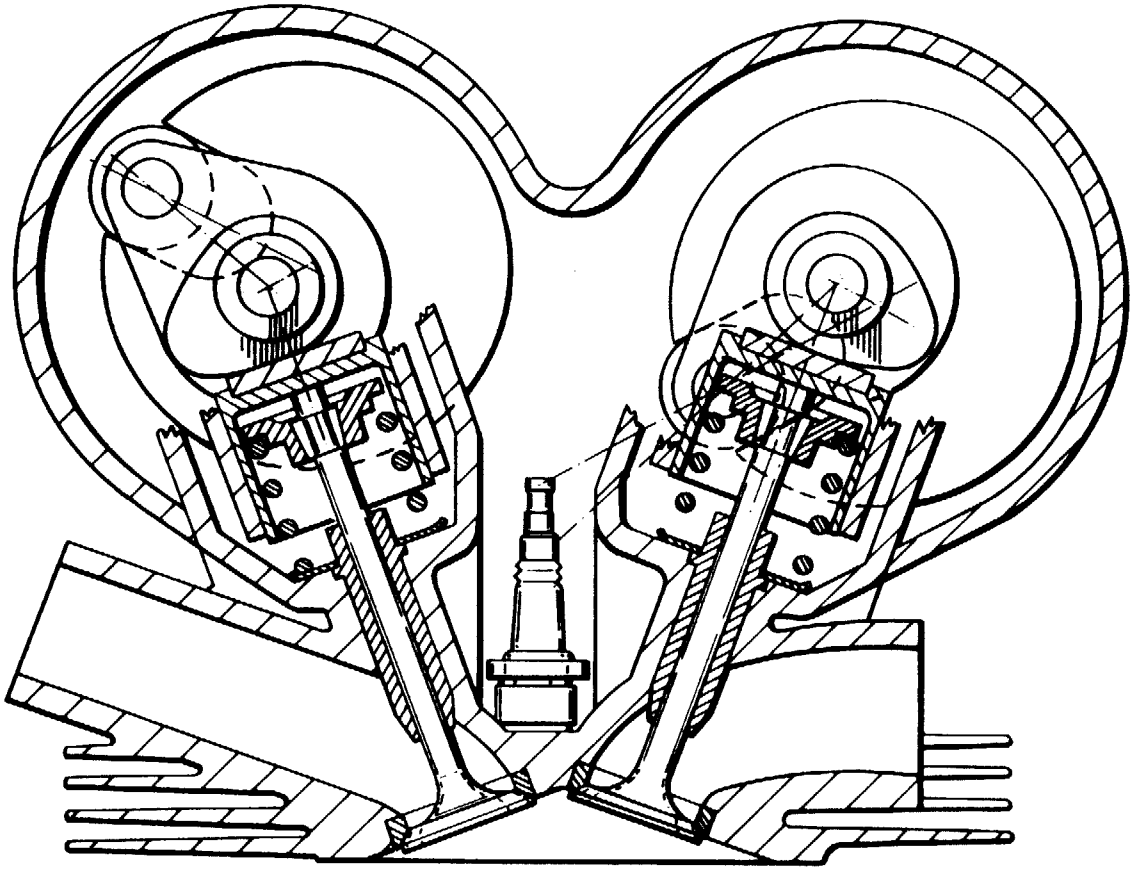
Figure 7:
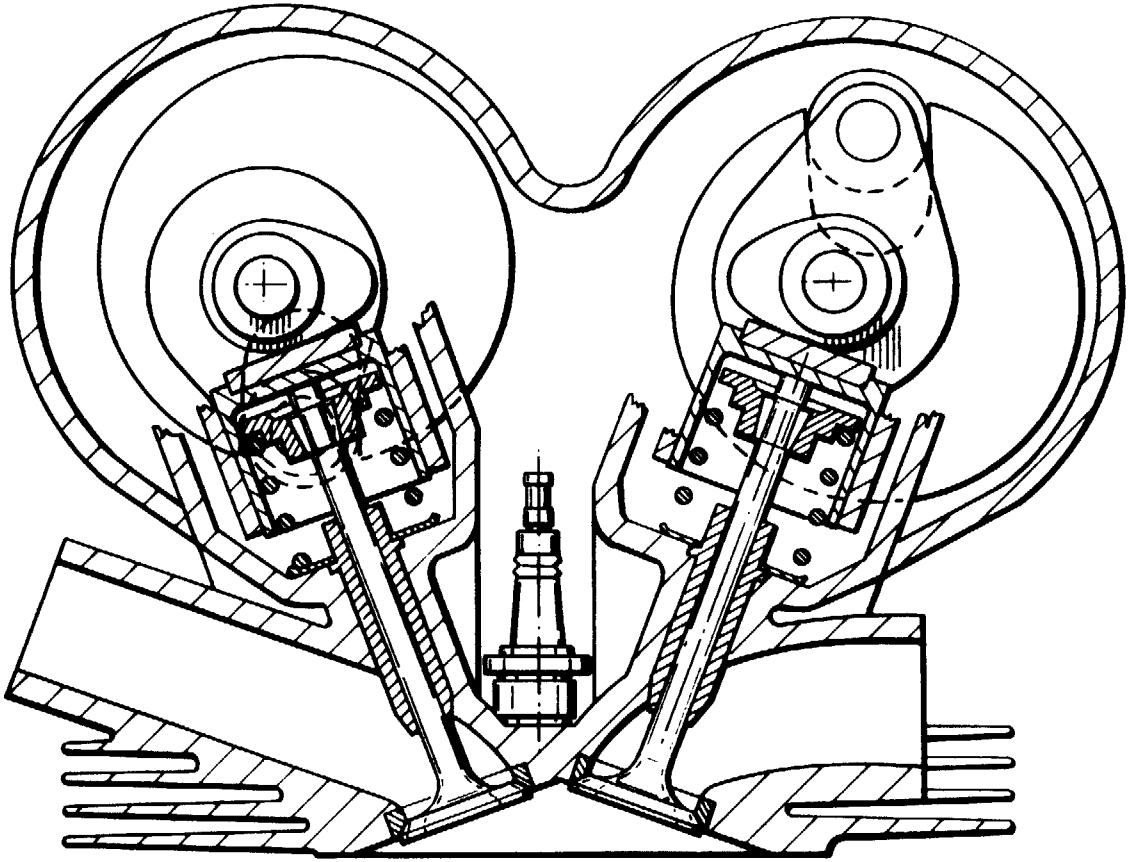

FIG. 6 shows the inlet and exhaust valves about to open, and FIG. 7 shows the inlet and exhaust valves about to close when the position of the arm 15 is moved so that the axes of the eccentric plates 12 and 19 are at their maximum eccentricity relative to the axes of the camshafts 7 and 17 respectively. The arm 15 is moved to the described position by the piston and cylinder arrangement 20 in low engine speed conditions, as will be apparent from the following description of FIG. 9. The angular positions of the followers 26 and 30 relative to the direction of movement of the arm 15 is such that the eccentric plates 12 and 19 have to turn through a greater angle in order for the cams 24 and 28 to be in position to start opening the valves. In the case of the inlet valve 5 which is in the high engine speed position normally opens substantially before the piston is at the TDC position, the engine crankshaft will have to rotate twice the angular movement that the eccentric plate 4 has to turn through and consequently the inlet valve will open later than it would in the high engine speed condition. Thus it now opens slightly before the piston is at the TDC position, although it can be arranged to open slightly after the TDC position if necessary. In the case of the exhaust valve 6 which in the high engine speed condition normally opens substantially before the piston is at the BDC position, the engine crankshaft will have to rotate twice the angular movement that the eccentric plate 19 has to turn through, and consequently the exhaust valve 6 will open later than it would in the high engine speed condition. It thus opens slightly before the piston is at the BDC position.

When the arm 15 is in the low engine speed position, the effect of the eccentricity of the eccentric plates 12 and 19 relative to the centres of the inlet and exhaust camshafts 7, 17 not only alters the opening positions of the inlet and exhaust cams relative to the engine crankshaft (FIG. 6) but the eccentric plates 12 and 19 have to rotate the camshafts through a reduced angular movement in order to close the inlet and exhaust valves. (FIG. 7). The reduced anguiar movements of the eccentric plates which are driven at half crankshaft speed results in both the inlet valves and the exhaust valves not only opening later but closing earlier, that is at full eccentricity the inlet valve will open slightly before the piston is at the TDC position and close slightly after the piston is at the BDC position, and the exhaust valve will open slightly before the piston is at the BDC position and will close slightly after the TDC position although it can be arranged to close slightlly before the TDC position.

Figure 8:
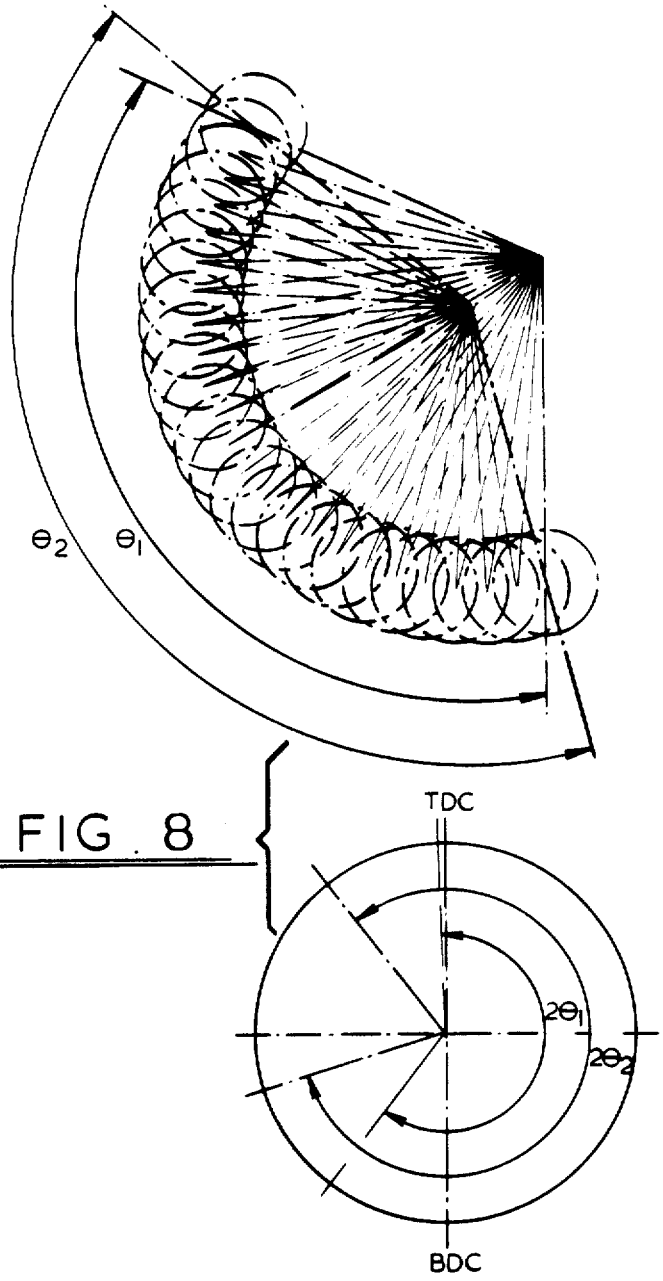
FIG. 8 illustrates the angular movement of an inlet camshaft under varying conditions.

FIG. 8 illustrates the angular movement of the inlet camshaft 7 relative to the constant angular movement of the eccentric plate 12 during the full period of inlet valve opening and closing, the movement of the camshaft 7 whilst the *inlet cam* 24 is on its base circle not being relevant. It can be seen that the direction of the eccentricity if along an axis such that the reduction in angular movement as a result of the eccentricity is equally divided between the opening and closing of the cam, but this need not necessarily be so and another axis could be chosen that would alter the rate of opening relative to the rate of closing so that the angular difference between the opening of the inlet valve at high engine speeds to the opening of the inlet valve at low engine speeds would be different to the angular difference between the inlet valve closing at high engine speeds and the inlet valve closing at low engine speeds. These differences can also apply to the operation of the exhaust valve.

The rate of change of angular velocity of the camshaft when the eccentric plate 12 is eccentric to the camshaft substantially follows a smooth curve and the minimum rate of change of angular velocity is advantageously arranged when the cam starts to open or just close the valve and considering the modifying effect of the rate of change of valve opening velocity as determined by the cam profile, the resulting opening and closing trajectory of the valve at low speeds is ideally suited to the valve opening requirements as demanded by the engine due to the fact that cam profiles which are designed for high engine speeds that apply negative acceleration to the valve gear when the valve has opened less than half of its total movement in order that the valve return spring can provide the force to keep the valve assembly in contact with the cam profile. At low engine speeds when the inertia loadings of the valve gear are small, the effect of the eccentric mechanism delays the negative acceleration acting on the valve so that the inlet valve for example will be open further at the position of maximum piston velocity which would suggest a further improvement in volumetric efficiency.

Figure 9:
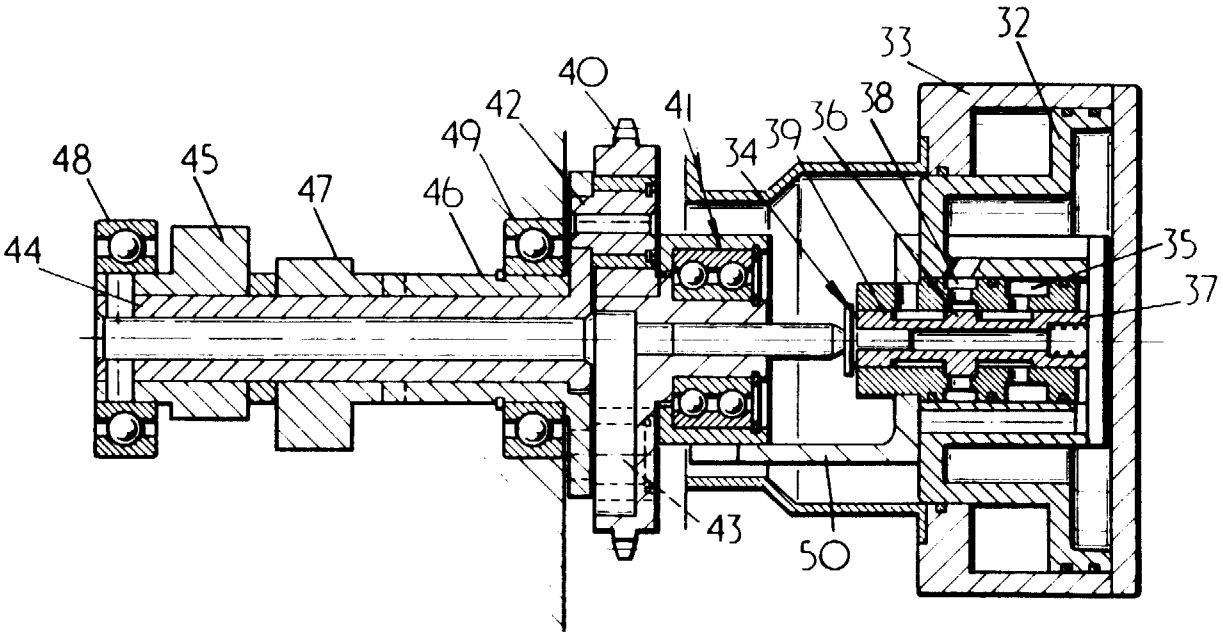
FIG. 9 is a detailed sectional view of a piston and cylinder arrangement such as that shown in FIG. 3, but arranged to control an alternative valve timing mechanism according to the present invention.

FIG. 9 illustrates a piston and cylinder arrangement 20 such as that shown in FIG. 3 and an alternative valve timing mechanism to that shown in FIG. 3.

The arrangement 20 comprises a piston 32 movable in a cylinder 33 under the influence of oil pressure derived from the engine oil pump. A control piston 34 is positioned by a unit [now] *not* shown) such as a centrifugal device to sense engine speed which can be used in conjunction with a diaphragm in the inlet manifold to sense engine load, or it can be positioned by means of an electrical unit controlled from suitable transducers, the actuating force on the control piston 34 being small. The control piston 34 is carried by the body of the piston 32 so that the relative movement of the two pistons 32 and 34 can provide a regulating action.

Oil from the engine oil pump is directed into the cylinder 33 on the annulus side of the piston 32 the area of this side of the piston being 50% of the full area of the piston. A feed from the annulus side of the piston 32 is taken into a recess 35 where it is directed through holes into a recess between lands 36, 37 of the control piston 34.

The width of the land 36 of the control piston 34 is less than that of a recess 38 in the body of the piston 32 such that oil will flow from the recess between lands 36 and 37 into recess 38 and escape into the recess between a land 39 and land 36 of the control piston 34 and then leak away into the engine through the holes provided around the left hand end of the control piston 34. The rate at which the oil flows away from the recess 38 into the recess between lands 36 and 39 of the control piston 34 is a function of the difference between the width of the land 36 and the width of the recess 38 in the body of the piston 32, and the flow is such that the pressure in the recess 38 is half the supply pressure. The oil in recess 38 is fed to the full area of the piston 32 and it can be seen that half the supply pressure acting on the full area of the piston will equal the thrust produced by [te] *the* full supply pressure acting on the annulus area of the piston which is 50% of the full area.

Any small movement of the control piston 34 will alter the pressure acting on the full side of the piston 32 which will cause the piston to move. This movement relative to the control piston will continue until a state of equilibrium is once again reached.

In the mechanism illustrated in FIG. 3, the piston 32 positions the arm 15 in accordance with the position of the control piston 34 which in turn is positioned as a function of the speed, load or speed and load of the engine. The position of the piston 32 and the arm 15 will result in the correct amount of eccentricity of the eccentric plates 12 and 19 to give the desired valve timing for the particular engine speed, load or speed and load condition.

In the mechanism illustrated in FIG. 9, the control piston 34 is positioned by a centrifugal device comprising bob weights (not shown) which act on a rod slidably received in a sprocket 40 supported in bearings 41. The sprocket is provided with two slots in which followers 42 and 43 run. Follower 42 is secured to an exhaust valve camshaft 44 having cam 45 and follower 43 is secured to an inlet valve camshaft 46 having cam 47. The exhaust camshaft 44 runs inside the inlet camshaft 46 with the camshaft assembly being supported in bearings 48, 49.

The sprocket 40 is mounted in a sliding plate sliding in the direction perpendicular to the plane of FIG. 9. The position of the sprocket 40 relative to the camshafts is controlled by a pin (not shown) which slides inside an angled slot (not shown) in a plate 50 which is movable with the piston 32. As the piston 32 and hence the plate 50 move to the left in FIG. 9, the sprocket moves in the direction out of the plane of FIG. 9, and vice versa.

When the axes of the sprockets 40 and the camshafts coincide the cams 45 and 47 will operate the valves normally. When the sprocket moves so that the axes do not coincide the valve timing is adjusted in a manner which will be apparent from the preceding description of FIGS. 1 to 8.

It will be appreciated that the hydraulic unit described above could be replaced by an alternative actuating device. For example, in the embodiment shown in FIG. 9, a centrifugal arrangement could be used to directly control the positioning of the plate 50. The centrifugal arrangement would preferably be mounted on the crankshaft and linked to the plate 50 by a Bowden cable or other suitable linkage. The plate 5 could be biased to a low speed position by a spring.

It will also be appreciated that the described engines can use conventional cams designed in accordance with mathematical formulae to give the highest possible valve operating speeds with no additional mass at high engine speeds other than valve, valve tappet buckets, valve collets and collet head and a proportion of the mass of the valve spring as with a conventional overhead camshaft arrangement. It will also be appreciated that th variable eccentric plate mechanism can control the angular velocity of a fixed eccentric which can be used in place of a cam to open and close the valves.

It will also be appreciated that when the axis of the camshafts and eccentric plates coincide the followers will not move radially within the slots in the eccentric plates, but radial movement will occur when the axes do not coincide. In the described embodiments the axes are arranged to coincide at high engine speeds so that the maximum radial sliding movement of the followers which does occur is at a relatively low speed, but if desired the axes could be arranged to coincide at a low or intermediate speed.

The drive between the crankshaft and eccentric plates can be other than via gears, for example via chains.

It may be seen from FIG. 9 that exhaust and inlet valves may be driven by a single movable member.

Figure 10:
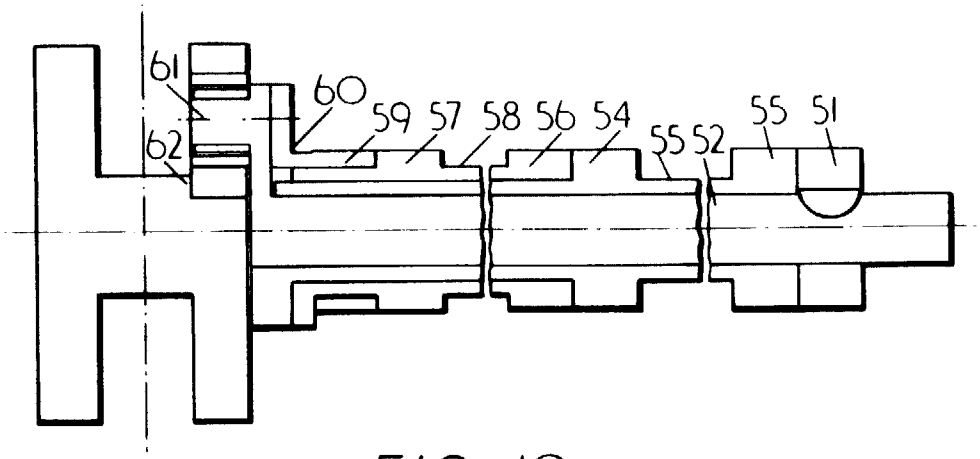
FIG. 10 is a schematic diagram of one camshaft arrangement which may be used in accordance with the present invention.

If desired all the valves of three in-line cylinders for example could be driven from a single movable member as shown in FIG. 10. This is achieved by providing the inlet cam 51 of the third cylinder on a first camshaft 52, the exhaust cam 53 of the third cylinder and the inlet cam 54 of the second cylinder on a second camshaft 55 through which the first camshaft extends, the exhaust cam 56 of the second cylinder and the inlet cam 57 of the first cylinder on a third camshaft 58 through which the first and second camshafts extend, and the exhaust cam 59 of the first cylinder on a short fourth camshaft 60 rotating on the third camshaft and with the first camshaft. The first and fourth camshafts are connected by a single follower 61 to a movable member 62 to which the second and third camshafts are also connected by respective followers (not shown). Three further in-line cylinders can be driven from the other side of the movable member 62.

What is claimed is:

[1. A valve timing mechanism for an internal combustion engine including at least one valve-actuating camshaft driven from a crankshaft, said camshaft having at least one cam element fixedly mounted thereon, the mechanism comprising, a movable member arranged in use to be rotatable by the crankshaft and movable in translation relative to the camshaft in dependence upon an engine operating condition, the movable member being connected to the camshaft by an eccentric linkage such that movement of the movable member relative to the camshaft varies the angular position of the camshaft about its axis of rotation relative to the angular position of the crankshaft about its axis of rotation and also varies the rate of angular movement of the camshaft, relative to the angular velocity of the crankshaft thereby varying the valve timing.]

[2. An internal combustion engine comprising at least one cylinder, at least one inlet and at least one exhaust valve for the or each cylinder, camshafts, said camshafts having at least one cam element fixedly mounted thereon for opening the inlet and outlet valves of the or each cylinder, a crankshaft, and means for driving the camshafts from the crankshaft, the driving means comprising a movable member rotatable by the crankshaft and connected to at least one camshaft by an eccentric linkage, and the rotatable member being movable in translation relative to said at least one camshaft in dependence upon an operating condition of the engine, movement of the movable member causing the eccentric linkage to vary the angular position of the camshaft about its axis of rotation relative to the angular position of the crankshaft about its axis of rotation and also to vary the rate of angular movement of the camshaft relative to the angular velocity of the crankshaft, thereby varying the valve timing.]

[3. An internal combustion engine according to claim 2, comprising means for moving the rotatable member in dependence upon engine load.]

[4. An internal combustion engine according to claim 2, comprising means for moving the rotatable member in dependence upon engine speed.]

[5. An internal combustion engine according to claim 2, comprising means for moving the rotatable member in dependence upon engine load and speed.]

[6. An internal combustion engine according to claim 2, wherein the movable member is supported on a pivotal arm.]

[7. An internal combustion engine according to claim 2, wherein the movable member is supported on a slide.]

[8. An internal combustion engine according to claim 6, wherein the position of the movable member is controlled by a piston and cylinder arrangement comprising a control piston the position of which is dependent upon an engine operating condition, a main piston in which the control piston is slidably received, and a cylinder in which the main piston is received, a linkage being provided between the main piston and the support for the movable member.]

[9. An internal combustion engine according to claim 6, wherein the pivotal arm supports two rotatable members one of which drives the inlet valve camshaft and the other of which drives the outlet valve camshafts, the two rotatable members rotating at the same rate as each other.]

[10. An internal combustion engine according to claim 9, wherein the rotatable members are meshed together and one of them is driven by a gear train from the crankshaft, one gear in the train being pivotal about the same axis as the pivotal arm.]

[11. An internal combustion engine according to claim 2, wherein the or each movable member comprises a plate provided with a radial slot which slidably receives a follower supported eccentrically by the camshaft.]

[12. An internal combustion engine according to claim 2, comprising four in-line cylinders, and four in-line inlet valve camshafts, each camshaft controlling at least one valve of a respective cylinder, and the camshafts being arranged in pairs on opposite side of a single drive means with one camshaft of each pair being driven by a shaft extending through the other camshaft of the pair.]

[13. An internal combustion engine according to claim 2, the timing mechanism being such that the inlet valve timing may be altered to open an inlet valve nearer to top dead centre while simultaneously the inlet valve timing is altered to close the inlet valve nearer to bottom dead centre, and the exhaust valve timing may be altered to open an exhaust valve nearer to bottom dead centre while simultaneously the exhaust valve timing is altered to close the exhaust valve nearer to top dead centre.]

[14. An internal combustion engine according to claim 13, wherein the degree of alteration to the position of inlet valve opening at any particular instant can be different to the degree of alteration to the position of inlet valve closing at the same particular instant.]

[15. An internal combustion engine according to claim 13, wherein the degree of alteration to the position of exhaust valve opening at any particular instant can be different to the degree of alteration to the position of exhaust valve closing at the same particular instant.]

[16. An internal combustion engine according to claim 13, wherein the degree of alteration to the inlet valve opening and closing at any particular instant can be different to the degree of alteration to the exhaust valve opening and closing at the same particular instant.]

[17. An internal combustion engine according to claim 2, wherein inlet and exhaust valves are driven by the same movable member.]

*18. A valve timing mechanism for an internal combustion engine including*

*a crankshaft;*

*at least one cylinder;*

*an inlet valve and an outlet valve for said cylinder;*

*means defining first and second axes of rotation;*

*an inlet camshaft mounted to rotate about said first axis of rotation and carrying an inlet valve cam to operate said inlet valve, and an exhaust camshaft mounted to rotate about said second axis of rotation and carrying an exhaust valve cam to operate said exhaust valve;*

*a member movable in dependence upon an engine operating condition;*

*a driving mechanism driven from said crankshaft and mounted on said movable member;*

*means defining third and fourth axes of rotation;*

*said driving mechanism comprising*

*a first rotary member, mounted to rotate about said third axis and eccentrically-connected to said inlet camshaft, said third axis being parallel to but displaceable relative to said first axis, and*

*a second rotary member, mounted to rotate about said fourth axis and eccentrically-connected to said exhaust camshaft, said fourth axis being parallel to but displaceable relative to said second axis;*

*said third and fourth axes being fixed to said movable member and relative to each other, whereby said movement of said movable member varies the said eccentricity of said connections between said first rotary member and said inlet camshaft and said second rotary member and said exhaust camshaft, thereby varying the rate of angular movement of said camshafts relative to the angular movement of said crankshaft and so varying the timing of said inlet and exhaust valves.*

*19. A valve timing mechanism according to claim 18 in which said third and fourth axes are coincident and said first and second rotary members are combined in a single rotary member, mounted on said movable member and eccentrically connected both to said inlet camshaft and to said exhaust camshaft.*

*20. A valve timing mechanism for an internal combustion engine including*

*a crankshaft;*

*at least one cylinder;*

*an inlet valve and an outlet valve for said cylinder;*

*means defining first and second axes of rotation;*

*an inlet camshaft mounted to rotate about said first axis of rotation and carrying an inlet valve cam to operate said inlet valve, and an exhaust camshaft mounted to rotate about said second axis of rotation and carrying an exhaust valve cam to operate said exhaust valve;*

*mechanism movable in dependence upon an engine operating condition;*

*driving means driven from said crankshaft and mounted on said movable mechanism;*

*means defining third and fourth axes of rotation;*

*said driving means comprising a first rotary member, mounted to rotate about said third axis and eccentrically-connected to said inlet camshaft, said third axis being parallel to but displaceable relative to said first axis, and*

*a second rotary member, mounted to rotate about said fourth axis and eccentrically-connected to said exhaust camshaft, said fourth axis being parallel to but displaceable relative to said second axis;*

*said third and fourth axes being at a constant spacing-apart relative to each other, whereby said movement of said movable member varies the said eccentricity of said connections between said first rotary member and said inlet camshaft and said second rotary member and said exhaust camshaft without varying said spacing-apart of said third and fourth axes, thereby varying the rate of angular movement of said camshafts relative to the angular movement of said crankshaft and so varying the timing of said inlet and exhaust valves.*

*21. A valve timing mechanism according to claim 20 in which said inlet camshaft and said exhaust camshaft are coaxial.*

*22. A valve timing mechanism according to claim 20 in which said inlet camshaft and said exhaust camshaft are parallel to and laterally spaced from each other.*

*23. A valve timing mechanism according claim 20 in which said third and fourth axes are coincident and said first and second rotary members are combined in a single rotary member, eccentrically connected both to said inlet camshaft and to said exhaust camshaft.*

*24. A valve timing mechanism according to claim 20 in which said driving means comprises two separate rotary members mounted to rotate about parallel but spaced-apart axes.*

*25. A valve timing mechanism according to claim 20 in which said mechanism movable in dependence upon an engine operating condition comprises a sliding member.*

*26. A valve timing mechanism according to claim 20 in which each of said eccentric connections between said first rotary member and said inlet camshaft, and said second rotary member and said exhaust camshaft, comprises a radial slot formed in the respective rotary member and slidably-receiving a follower supported eccentrically by the respective said camshaft.*

*27. A valve timing mechanism according to claim 20 comprising four in-line cylinders and four in-line inlet camshafts, each said inlet camshaft controlling at least one inlet valve of a respective cylinder, and the said inlet camshafts being arranged in pairs on opposite sides of a single said driving means with one camshaft of each pair being driven by a shaft extending through the other camshaft of the pair.*

*28. A valve timing mechanism according to claim 20 in which the inlet valve timing may be altered to open an inlet valve nearer to top dead center while simultaneously the inlet valve timing is altered to close the inlet valve nearer to bottom dead center, and the exhaust valve timing may be altered to open an exhaust valve nearer to bottom dead center while simultaneously the exhaust valve timing is altered to close the exhaust valve nearer to top dead center.*

*29. A valve timing mechanism according to claim 28, wherein the degree of alteration to the position of inlet valve opening at any particular instant can be different to the degree of alteration to the position of inlet valve closing at the same particular instant.*

*30. A valve timing mechanism according to claim 28, wherein the degree of alteration to the position of exhaust valve opening at any particular instant can be different to the degree of alteration to the position of exhaust valve closing at the same particular instant.*

*31. A valve timing mechanism according to claim 28 wherein the degree of alteration to the inlet valve opening and closing at any particular instant can be different to the degree of alteration to the exhaust valve opening and closing at the same particular instant.*

*32. A valve timing mechanism according to claim 20 in which said mechanism movable in dependence upon an engine operating condition comprises a pivoted arm.*

*33. A valve timing mechanism according to claim 32, wherein the position of the pivoted arm is controlled by a piston and cylinder arrangement comprising a control piston the position of which is dependent upon said engine operating condition, a main piston in which said control piston is received, and a cylinder in which the main piston is received, a linkage being provided between said main piston and said pivoted arm.*

*34. A valve timing mechanism according to claim 32 in which said driving means comprises two separate rotary members, mounted on said pivoted arm to rotate at the same rate as each other and about parallel but spaced-apart axes.*

*35. A valve timing mechanism according to claim 34 wherein said two separate rotary members are meshed together and one of them is driven by a gear train from said crank shaft, one gear in the said train being pivotal about the same axis as the pivoted arm.*

* * * * *